United States Patent
Ross

[19]

[11] Patent Number: 5,857,549
[45] Date of Patent: Jan. 12, 1999

[54] TORQUE TRANSMITTING DEVICE WITH A LEVER APPLY SPRING

[75] Inventor: Christopher Brian Ross, Chelsea, Mich.

[73] Assignee: General Motors Corporation, Detroit, Mich.

[21] Appl. No.: 912,439

[22] Filed: Aug. 18, 1997

[51] Int. Cl.[6] .................................................. F16D 13/52
[52] U.S. Cl. .................................. 192/85 AA; 192/99 A; 188/72.6
[58] Field of Search ........................... 192/85 AA, 99 A, 192/85 CA; 188/72.4, 72.6

[56] References Cited

U.S. PATENT DOCUMENTS

| | | | |
|---|---|---|---|
| 3,237,739 | 3/1966 | Pritchard | 192/99 A |
| 3,926,269 | 12/1975 | Stauble et al. | 192/85 AA X |
| 5,103,953 | 4/1992 | Nakayama et al. | 192/99 A X |

FOREIGN PATENT DOCUMENTS

| | | | |
|---|---|---|---|
| 3545842 | 1/1987 | Germany | 192/99 A |
| 2099934 | 12/1982 | United Kingdom | 192/99 A |

*Primary Examiner*—Rodney H. Bonck
*Assistant Examiner*—Ankur Parekh
*Attorney, Agent, or Firm*—Donald F. Scherer; Michael J. Bridges

[57] ABSTRACT

A torque transmitter has a plurality of friction plates alternately splined at the inner and outer peripheries. The plates are urged into frictional engagement by a piston and a lever spring to accommodate torque transmission between the splined components drivingly connected with the splined peripheries. The friction plates are disposed in radial alignment with the piston and the lever spring reacts against one of the friction plates. A fulcrum for the lever spring is disposed on one of the splined components.

3 Claims, 1 Drawing Sheet

TORQUE TRANSMITTING DEVICE WITH A LEVER APPLY SPRING

TECHNICAL FIELD

This invention relates to fluid operated frictionally engaging torque transmitting devices.

BACKGROUND OF THE INVENTION

Conventional fluid actuated torque transmissions, for example, clutches and brakes, have a plurality of axially aligned friction plates which are alternately splined with an inner member and an outer member. In the case of a clutch, one member is connected with a rotatable shaft and the other member is connected with a gear element. In the case of a brake, one member is connected with a stationary housing and the other member is connected with a shaft or gear.

The friction plates are forced into frictional engagement by pressure on a fluid operated axially movable piston. The piston has an apply surface that directly engages one of the plates which is axially aligned therewith. However, the piston has a larger annular area than the friction plates, resulting in the center of pressure being radially offset from the apply surface. This establishes an overturning moment on the piston. The piston is urged to the disengaged position by a plurality of return springs when the pressure is reduced.

The piston and friction plates are stacked in series in an axial direction. This requires that the torque transmitter be provided with an overall axial dimension to the accommodate the plates, piston, axial movement of the piston and the housing in which the piston is selectively disposed. Also, the piston establishes sufficient structure and bearing surfaces to accommodate the overturning moment. This axial positioning within the transmission utilizes valuable space under the hood of the modern passenger vehicle. The piston structure can impose weight and cost factors which increase the overall cost of the transmission.

SUMMARY OF THE INVENTION

It is an object of the present invention to provide an improved torque transmitter assembly having an apply piston axially aligned with the torque transmitting friction device.

In one aspect of the invention, a plurality of friction plates and an apply piston are radially aligned and operatively connected by an annular spring lever.

In another aspect of the invention, a spring lever has an annular base adjacent the piston and an apply portion comprised of a plurality of fingers having apply tabs adjacent one of the friction plates.

In yet another aspect of the invention, the fingers radiate outwardly from the base.

In a further aspect of the invention, the piston is slidably disposed in a housing which also supports a fulcrum for the lever spring.

In yet a further aspect of the invention, the lever spring is an annular Belleville type spring.

In a still further aspect of the invention, the piston is positioned radially inward of the friction plates.

DESCRIPTION OF AN EXEMPLARY EMBODIMENT

Figure 1:
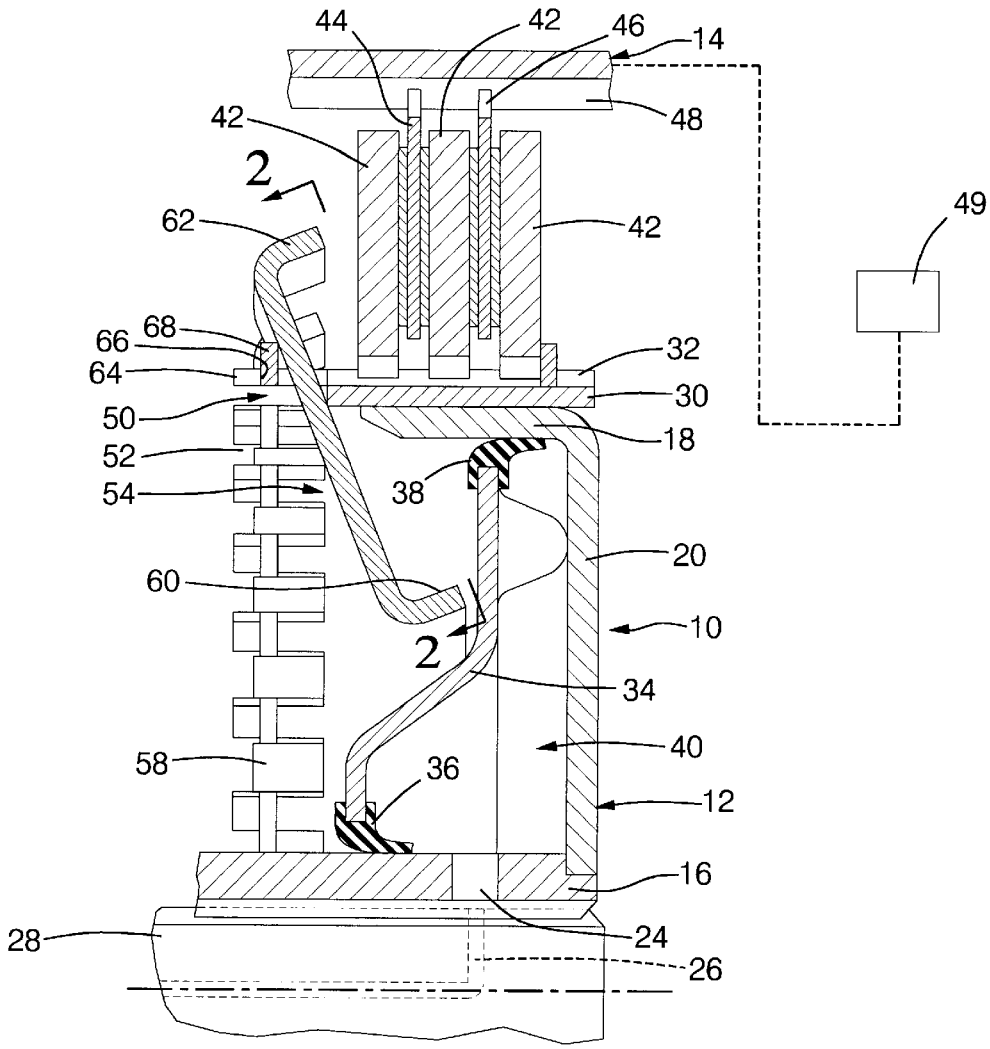
FIG. 1 is an elevational view in section of a torque transmitter incorporating the present invention.
Figure 2:
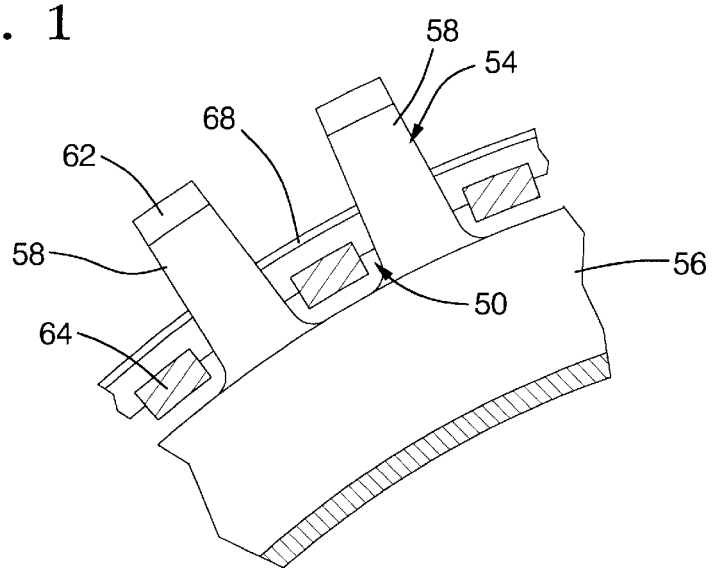
FIG. 2 is a view taken along line 2—2 in FIG. 1.

Referring the drawings, wherein like characters represent the same or corresponding parts throughout the several views, there is seen in FIG. 1 a torque transmitter assembly, generally designated 10, having an inner housing 12 and an outer housing 14. The inner housing 12 has spaced circumferentially extending walls 16 and 18 which are connected by a radial annular wall 20.

The circumferential wall 16 has formed therein a fluid passage 24 which is in fluid communication with a passage 26 formed in a drive shaft or transmission shaft 28. The circumferential wall 18 has secured thereto a hub 30 which has formed thereon a spline surface 32.

An annular piston 34 is provided with an inner lip seal 36 and an outer lip seal 38 which slidably and sealingly abut the wall 16 and wall 18, respectively. The piston 34 cooperates with the housing 12 to form a fluid chamber 40 which is in fluid communication with the passage 24. As pressurized fluid is admitted through the passage 24, the piston 34 will be urged leftward as viewed in FIG. 1.

The hub 30 has a plurality of friction discs or plates 42 connected therewith through the spline 32. Alternately spaced of the friction discs 42 is a plurality of friction discs or plates 44. The plates 44 have a splined outer periphery 46 which engages a spline 48 formed on the housing 14. The housing 14 may be connected to a conventional gear 49.

The hub 30 has a plurality of slots 50 formed therein at an end 52 thereof. A lever spring 54 has an annular base 56 and a plurality of radially extending spring fingers 58. The base 56 has an inner collar 60 which is disposed for abutment with the piston 34. Each of the spring fingers 58 has an apply tang 62 which is adapted to engage the leftmost friction plate 42 viewed in FIG. 1. The fingers 58 are disposed in respective slots 50 such that the base 56 is internal of the housing 12 and the fingers 58 extend radially outward through the housing 12 for engagement with the friction plate 42.

The slots 50 have formed adjacent thereof tongue members or extensions 64 each of which has a groove 66 formed therein. A lock ring 68 is secured in the grooves 66 which prevents the lever spring 54 from leftward movement relative to the housing 12.

The inner collar 60 of the lever spring 54 is aligned to contact the center of pressure of the piston 34 when the chamber 40 is pressurized. This prevents a tipping or turning moment from being present on the piston 34 such that all of the energy is utilized in axial movement of the piston.

Axial movement of the piston 34 results in pivoting of the spring at the lock ring 68 which provides a fulcrum for the lever spring 54. When the fingers 58 engage the friction plate 42 due to axial movement of the piston 34, the plates 42 and plates 44 will be forced into frictional engagement such that torque will be transmitted between the housing 12 and the housing 14.

In the embodiment shown, this will permit the transmission of torque from the shaft 28 to the gear 49. The transmitter 10 can also be a brake member in which case the housing 14 would be stationary and the housing 12 could be secured to either a gear member or a shaft. Thus, when the friction plates are engaged, the housing 12 would be brought to a halt. Likewise, as a brake member, the housing 12 can be a stationary circumferentially outer member while the housing 14 is an internal unit which can engage either a gear or a shaft to provide a braking function for that gear or shaft.

When the piston 34 is moved axially to enforce contact between the apply tang 62 and the friction plate 42, the spring fingers 58 will deflect such that the force input to the friction plates 42 and 44 will be increased as the piston moves axially without significant axial movement of the friction plates 42 and 44. When the fluid pressure in the chamber 40 is relieved, the spring force in the fingers 58 will cause the piston to return to the disengaged condition shown in FIG. 1. Thus, the spring fingers provide a mechanism for distributing the apply force to the friction plates 42 and 44 as well as enforcing disengagement of the friction plates when the fluid pressure on the piston is relieved.

It should be noted that either as a clutch or brake, the torque transmitter 10 takes a minimum of axial space within the overall assembly in which it is utilized. This is evident because the piston 34 is radially aligned with the friction plates 42 and 44 resulting in a compact axial design.

I claim:

1. A torque transmitting assembly comprising:

a housing having a splined periphery;

an annular piston slidably disposed in said housing and cooperating therewith to form a fluid chamber;

a plurality of first friction plates drivingly connected with said splined periphery;

a plurality of second friction plates alternately spaced with said first friction plates, said first and second friction plates being in radial alignment with said piston;

a lever spring having a base portion disposed adjacent said piston, an apply portion disposed adjacent one of said friction plates, one of said base portion and said apply portion comprised of finger members each extending through respective slots formed in said housing, said lever spring being retained in said slots by a reaction member secured to said housing and providing a fulcrum for said lever spring; and means drivingly connected with said second friction plates, said fluid chamber being pressurized to urge said piston toward an engaged position to act on said lever spring to enforce frictional engagement between said first and second friction plates to establish a torque transmitting relation between said housing and said means drivingly connected with said second friction plates.

2. The torque transmitting assembly defined in claim 1 wherein said fingers have sufficient resiliency to urge said piston toward a disengaged position to release the frictional engagement.

3. The torque transmitting assembly defined in claim 1 wherein said fingers form said apply portion and radiate radially outward from said base portion.

* * * * *